United States Patent
Mondfrans

(10) Patent No.: US 11,407,346 B1
(45) Date of Patent: Aug. 9, 2022

(54) UPPER BODY SUPPORT SYSTEM

(71) Applicant: Brandon Mondfrans, Cibolo, TX (US)

(72) Inventor: Brandon Mondfrans, Cibolo, TX (US)

( * ) Notice: Subject to any disclaimer, the term of this patent is extended or adjusted under 35 U.S.C. 154(b) by 0 days.

(21) Appl. No.: 17/590,030

(22) Filed: Feb. 1, 2022

(51) Int. Cl.
  *B60N 2/882* (2018.01)
  *B60N 2/28* (2006.01)
  *B60N 2/885* (2018.01)

(52) U.S. Cl.
  CPC ........... *B60N 2/882* (2018.02); *B60N 2/2872* (2013.01); *B60N 2/885* (2018.02)

(58) Field of Classification Search
  CPC ....... B60N 2/882; B60N 2/885; B60N 2/2872
  See application file for complete search history.

(56) References Cited

U.S. PATENT DOCUMENTS

| | | | |
|---|---|---|---|
| 3,578,383 A | 5/1971 | Earl | |
| 5,486,037 A | 1/1996 | Harper | |
| 5,871,487 A | 10/1999 | Passehl | |
| 6,142,574 A | 11/2000 | Alexander | |
| 6,394,554 B1 * | 5/2002 | Hingle | B60N 2/882 297/DIG. 6 |
| 7,093,903 B2 | 8/2006 | O'Connor et al. | |
| 7,758,125 B2 * | 7/2010 | Mittelstadt | B60N 2/882 5/640 |
| 8,272,674 B2 | 9/2012 | Vance | |
| 8,714,655 B2 | 5/2014 | Cahall et al. | |
| 2010/0148560 A1 * | 6/2010 | MacPherson | B60N 2/2851 297/397 |
| 2012/0074756 A1 | 3/2012 | Sayre | |
| 2013/0088063 A1 | 4/2013 | Montes | |
| 2015/0145307 A1 | 5/2015 | Arriola et al. | |
| 2015/0375651 A1 * | 12/2015 | Palma | B60N 2/882 297/181 |
| 2016/0355109 A1 | 12/2016 | Geraty | |
| 2017/0313221 A1 * | 11/2017 | Cormier | B60N 2/885 |
| 2020/0094720 A1 | 3/2020 | Cooper | |

* cited by examiner

*Primary Examiner* — Anthony D Barfield
(74) *Attorney, Agent, or Firm* — Invention To Patent Services; Alex Hobson

(57) ABSTRACT

An upper body support system for a vehicle seat provides support of a person's head and body via a body portion that extends down along the seat back rest from a stabilizer portion that extends over the top of the seat. The body portion may extend down a substantial portion of the back rest to provide support of the person's upper body. The bottom end of the support is secured by a base strap that is configured to form an anchor loop that is couple with a seat anchor of the vehicle seat. The top of the support is secured to a pair of head rest posts by a head rest strap assembly. This arrangement of securing the top and bottom of the support provides effective stability for a person to lean there against and enables the body portion to be configured in an offset angle from vertical for comfort.

20 Claims, 5 Drawing Sheets

UPPER BODY SUPPORT SYSTEM

BACKGROUND OF THE INVENTION

Field of the Invention

The invention relates to an upper body support system for a vehicle seat that provides support of a person's head and body via a body portion that extends down along the seat back rest from a stabilizer portion that extends over the top of the seat.

Background

There are a number of auxiliary head rest devices configured to couple with various components of a vehicle seat, such as the seatbelt or head rest, to provide support of a person's head. These devices extend down a short distance to a free end. Children that no longer are required to sit in a child or booster seat are often too short to utilize these auxiliary head rest devices as they are too short for proper support. Also, only supporting the head can in some cases put strain on the neck.

SUMMARY OF THE INVENTION

The invention is directed to an upper body support system for a vehicle seat that provides support of a person's head and body via a body portion that extends down along the seat back rest from a stabilizer portion that extends over the top of the seat. The body portion and the stabilizer portion may be a monolithic support that provides support for both the head and body and is stabilized in position by the stabilizer portion extending back over the top of the seat. The body portion may extend down a substantial portion of the back rest to provide support of the person's body, such as their shoulder, for example. In addition, the extended end of the body portion is secured by a base strap that is configured to couple with a seat anchor of the vehicle seat. The top of the monolithic support is secured to a pair of head rest posts by a head rest strap assembly. This arrangement of securing the monolithic support at the top and at the bottom provides effective support for a person to lean there against. Also, the body portion may be secured in an offset angle from vertical to provide for a more comfortable support for sleeping, for example.

A vehicle seat may be an automobile seat having required seat belts and seat anchors for the connection of car seats thereto. An automobile may be a truck, car, bus and the like. A vehicle seat may however be configured in an aircraft, train, ship or boat including a ferry and the like. A seat anchor may be any portion of the seat configured preferably proximal to the bottom of the back rest such as between the back rest and the seat portion of the seat, having a complete or partial loop that is effective to retain the base strap. In an automobile seat, the seat anchor is most often a complete loop that is configured down between the back rest and the seat portion and is typically coupled to the frame of the vehicle seat.

The upper body support system is configured to secure a monolithic support including a body portion and a stabilizer portion in position to effectively support a person's body during transport. The body portion and the stabilizer portion are a monolithic support that has the either the body portion and the stabilizer portion attached together to form said monolithic support, or are made from a single piece of material, such as foam, wherein the foam is cut from a single piece of material or formed as a single piece of material. A foam, such as a polyurethane or other polyolefin type foam may be formed or cut from a single piece of foam. A cover may be configured over the foam for comfort. The foam may be soft for comfort but stable enough for adequate support and may have a hardness of about 50 Shore A or less, about 40 Shore A or less, about 30 Shore A or less, about 20 Shore OO or more, about 30 Shore OO or more, about 40 Shore OO or more and any range between and including the values provided.

The body portion has a geometry to provide support of a person's head and body and to prevent tilting of the body portion during use. An exemplary body portion is configured to extend down a substantial portion of the back rest such as about 50% or more of the height of the back rest, about 60% or more, about 70% or more, about 80% or more, about 90% or more, up to 100% and any range between and including the percentages provided. The upper body support system is configured to support a person's body and therefore is required to extend down far enough for this purpose. Also, many children would require the body portion to extend down a substantial portion of the back rest for proper body support, as they are not that tall. The body portion may have a length of about 0.3 m or more, about 0.5 m or more, about 0.7 m or more, about 1 m or less and any range between and including the values provided. The body portion may have a width that is wide enough to provide effective cushioning and support when a person leans on the body support and may be about 7.5 cm or more, about 10 cm or more, about 12.5 cm or more, about 15 cm or more and any range between and including the width values provided. The length of the body portion may be much greater than the width of the body portion, such as about three times or more, about four times or more, about five times or more, or even about six times or eight times or more, or any range between and including the ratios provided. The body portion has a height that is large enough to effectively support a person's head and body and may be about 7.5 cm or more, about 10 cm or more, about 12.5 cm or more, about 15 cm or more and any range between and including the height provided. The body portion may have a rectangular cross-sectional shape taken along a length axis of the body portion, wherein the body portion has planar sides, seat surface and top surface, opposite the seat surface. Likewise, the stabilizer portion may also have a rectangular cross-sectional shape along a length axis of the stabilizer portion and have a planar seat surface, sides extending up from the seat surface and top surface, opposite the seat surface.

The stabilizer portion is configured to extend over the top of the seat to stabilize the body portion from tilting when a person leans against it. The seat surface of the stabilizer portion and the seat surface of the body portion may be planar to resist tilting of the support during use. The stabilizer portion may extend generally orthogonally from the length axis of the body portion to form an L-shaped support, that may be a monolithic support as described herein. Orthogonally, as used herein, is defined as within about 20 degrees of orthogonal, wherein the planar seat surface of the stabilizer extends within 20 degrees of orthogonal from the seat surface of the body portion. This orthogonal orientation may provide better stability of the support when configured over the top of the back rest with the body portion extending down along the back rest. The length axis of the body portion extends from the bottom end of the body portion up to the stabilizer portion. The stabilizer portion may have a length to effectively extend over the top of the seat and may be about 10 cm or more, abut 15 cm or more, about 20 cm or more about 25 cm or more and any range between and including the length values provided. The stabilizer portion may have a width that is substantially the same as the width of the body portion and may be about 7.5 cm or more, about 10 cm or more, about 12.5 cm or more, about 15 cm or more and any range between and including the width values provided.

The support, including the stabilizer portion and body portion, may be retained in a desired position on a vehicle seat by the head rest strap assembly and the base strap. The head rest strap assembly may include a first strap extension and a second strap extension, each configured to extend from the support around a head rest post to form a separate post loop. The first strap extension and second strap extension each have a head rest fastener, such as a buckle, that is configured to detachably attach with a head rest fastener coupler, such as a buckle receiver, to form a post loop. This configuration of two head rest straps forming two separate post loops around head rest posts on opposing sides of the support may be an effective way to secure the support in a fixed position between the two head rest posts. A first post loop may be shorter than the second post loop, such as by about 20% or more, about 40% or more, about 60% or more and any range between and including the percentages provided. A short first post loop and longer second post loop will position the monolithic support closer to the first post having the first post loop extending therearound. Also, the first and second post loops may have a head rest strap slider that enables the length of the post loop to be changed to pull the post loop tight about a head rest post. Again, this opposing arrangement of the two post loops around separate head rest posts enables each to be pulled tight to and to a separate length to change a position of the monolithic support between the two head rest posts. The monolithic support can be moved laterally closer to one of the head rest posts. Note that a single strap extending from the support and around the two head rest posts would not allow securing the support in a lateral or horizontal position between the two head rest posts.

The base strap extends from a position proximal to the bottom end of the body portion and is configured to extend through a seat anchor and back to a base fastener coupler, which may be configured on a base coupler strap. Two separate base straps may extend from body portion and each may have a base strap slider to enable tightening of the base strap to pull the bottom of the body portion closer to a seat anchor. This may allow the support and the body portion to be configured at an offset angle from vertical, which may be more comfortable for supporting person's body. In an exemplary embodiment, the base fastener and base fastener couplers are not configured to latch with a seatbelt buckle or seatbelt receiver and may be of a different size and latch differently from a seat belt buckle.

The body portion may be soft and as it may be made out of foam, may have a tendency to flex or bend when a force is applied orthogonally to the length axis of the body portion. To resist this deflection and to provide additional support and rigidity, a coupler extension strap may extend along the length of the body portion from the stabilizer portion, wherein the coupler extension strap is coupled with the head rest strap assembly, to the bottom end of the body portion, wherein it may be coupled with the base strap. The coupler extension strap may be pulled taught to prevent flexing and bending of the supple body portion. The top of the support and/or the bottom of the support may be moved to secure the support in an offset angle. The coupler extension strap may be an extension from the base strap assembly, such as being a continuous strap from the base strap or the base coupler strap. The coupler extension strap may slide through a guide and when the base strap is tightened through a seat anchor, it may tighten the coupler extension strap to provide rigidity of the body portion for effectively support a person's body.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
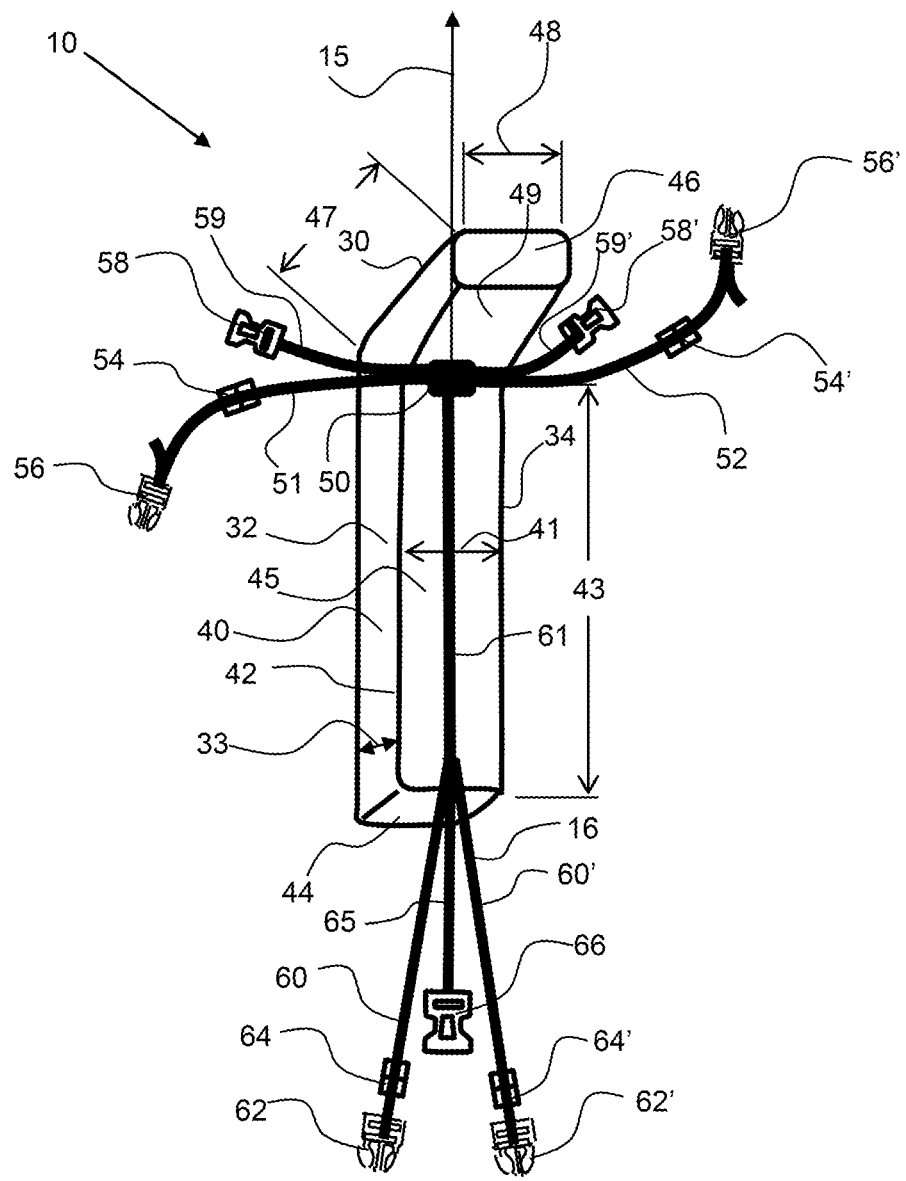
FIG. 1 shows a front side perspective view of an exemplary upper body support system incorporating a monolithic support.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary upper body support system 10 includes a support 40 having a body portion 42 that extends down a body portion length 43 from the stabilizer portion 46. The support may be a monolithic support wherein the body portion 42 and the stabilizer portion 46 are made from a single piece of material, such as a foam. The body portion 42 is configured to extend down along a seat back rest to provide support for a person's head and upper body. The stabilizer portion 46 has a length 47 that is configured to extend back over the top of a vehicle seat to stabilize the monolithic support 40 on the seat. The body portion has a seat surface 45 that is planar and the stabilizer portion 46 has a seat surface 49 that is also planar to prevent tilting or rolling of the monolithic support 40 during use. The width 41 of the body portion 42 and width of the stabilizer portion 48 may be wide enough to provide effective support. The body portion 42 has a length 43 from a bottom end 44 of the body portion to the stabilizer portion 46 that is greater than the length 47 of the stabilizer portion 46, by as much as two times or more, three times or more, or even four times or more. The width 41 of the body portion 42 may be about the same as the width 47 of the stabilizer portion 46, or within about 20%, or within about 10%, for example. The body portion 42 may have a substantially consistent width 41 along the length of the body portion, or along a length axis 15 of the body portion 42, wherein it does not vary by more than 20% or by more than 10% along the length of the body portion 42. The length axis 15 extends centrally along the length 43 of the body portion 42 from the bottom end 44 to the top of the body portion, or top 30 of the support 40. Also, the body portion 42 has a first side 32, and an opposing second side 34 that extends a height 33 from the seat surface 45 of the body portion 42. As described herein the sides of the body portion 42 may extend an effective height and may be planar to provide adequate support of a person's head and upper body, leaning thereon.

A head rest strap assembly 50 is configured proximal to the stabilizer portion 46, such as being coupled to the seat surface 49 of the stabilizer portion 46 or seat surface 45 of the body portion 42, such as in the area between the stabilizer portion 46 and the body portion 42. The head rest strap assembly 50 is configured to secure the monolithic support 40 between head rests. As shown, the head rest strap assembly 50 has a first strap extension 51 that is configured with a head rest fastener 56, such as a buckle, that is configured to detachable attach with the head rest fastener coupler 58, that may be configured on a head rest receiver strap 59. A head rest strap slider 54 may be used to pull the first strap extension 51 tight after the first strap extension forms a first post loop 53, shown in FIG. 2, with the first head rest fastener 56 detachably attached with the first head rest fastener coupler 58, which again may be configured on a head rest receiver strap 59. The head rest strap assembly 50 has a second strap extension 52 that also has a head rest fastener 56' that is configured to detachable attach with a head rest fastener coupler 58' that may be configured on a head rest receiver strap 59'. Again, a head rest strap slider 54' may be used to pull the second strap extension 52 tight after the second strap extension 52 forms a second post loop 53', shown in FIG. 2, with the second head rest fastener 56' detachably attached with the first head rest fastener coupler 58, which again may be configured on a head rest receiver strap 59'. As described herein, two separate head rest straps that form two separate post loops enable the support 40 to be configured in a desired position laterally between head rest posts.

A base strap assembly 16 includes a pair of base straps 60, 60' that extend from a position proximal the base or bottom end 44 of the body portion 42 and each have a base fastener 62, 62' and a base strap slider 64, 64' that can be used to tighten the respective base strap 60, 60'. A base fastener coupler 66 is configured on a base coupler strap 65 and is configured to detachably attach with one of the base fasteners 62, 62'. The base strap 60, 60' and/or the base coupler strap 65 may be extended through a seat anchor of a seat and the base fastener coupler may be coupled with the base fastener 62, 62' to form an anchor loop 63, shown in FIG. 2, extending through the seat anchor, to secure the body portion in position. A base strap slider 64, or 64' may be used to tighten the anchor loop.

Figure 2:
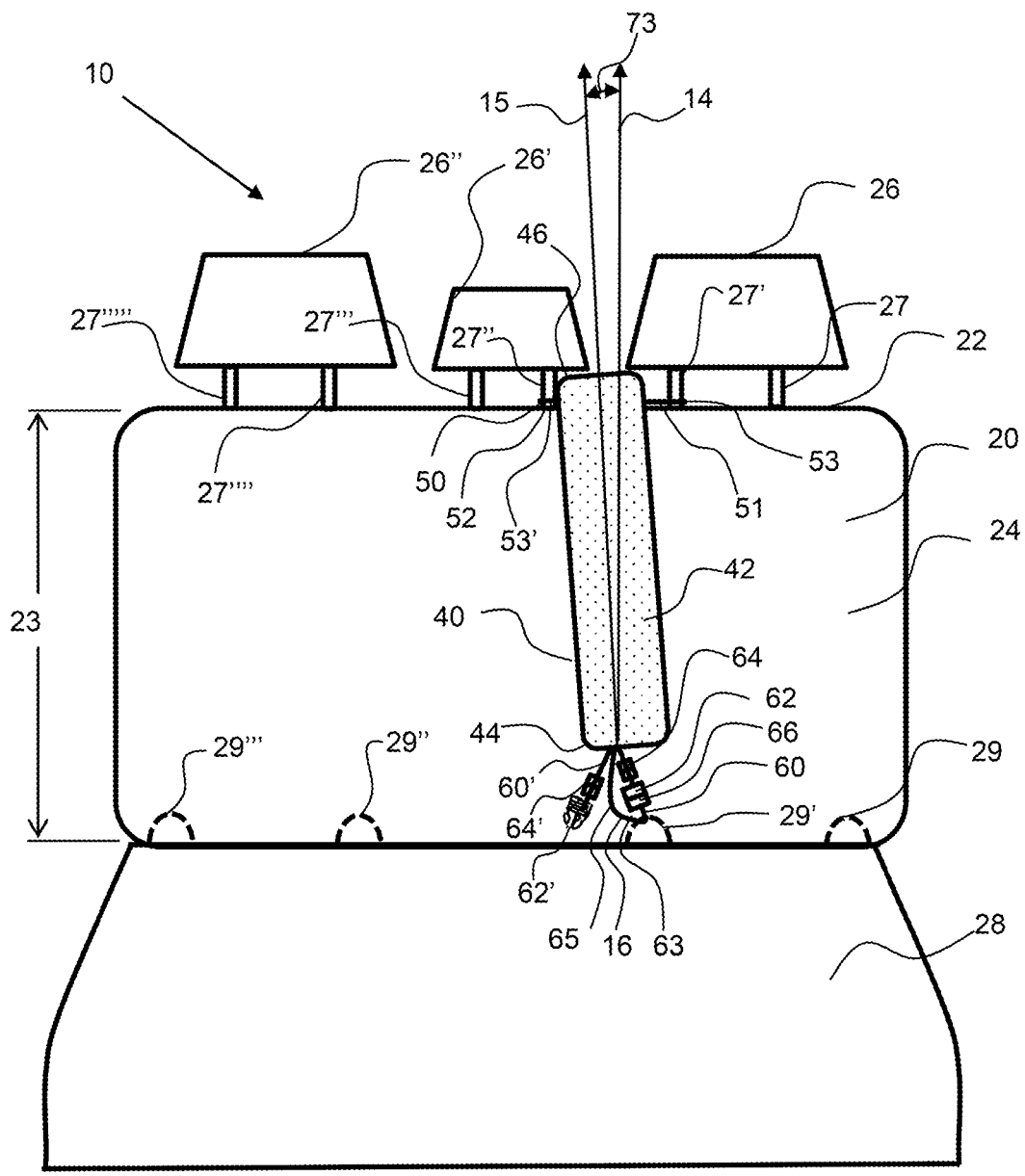
FIG. 2 shows a front view of an exemplary upper body support system coupled to the head rest and extending down along the back rest of the vehicle seat.

As described herein, the body portion 42 may be soft and as it may be made out of foam, and therefore, may have a tendency to flex or bend when a force is applied orthogonally to the length axis of the body portion. To resist this deflection and to provide additional support and rigidity, a coupler extension strap 61 may extend along the length of the body portion 42 from the stabilizer portion 46, wherein the coupler extension strap 61 is coupled with the head rest strap assembly 50, to the bottom end 44, or proximal the bottom end of the body portion 42, wherein it may be coupled with the base strap assembly 16. The coupler extension strap 61 may be pulled taught to prevent flexing and bending of the supple body portion 42. The coupler extension strap 61 may slide through a guide and when the base strap 60 is tightened through a seat anchor, it may tighten the coupler extension strap 61 to provide rigidity of the body portion 42 for effectively support a person's body As shown in FIG. 2, the upper body support system 10 is configured and secured to a vehicle seat 20 with the support 40 coupled to two adjacent head rest posts 27" and 27' by the head rest strap assembly 50 and to the seat anchor 29' by the base strap assembly 16. The body portion 42 extends down a substantial portion of the height 23 of the back rest 24, or about 60% or more, about 75% or more, about 90% or more, and any range between and including the percentages provided. Note that a space between the bottom end 44 of the support 40 and the seat portion 28 of the vehicle seat 20 may allow easier manipulation of the base straps or the base coupler strap, for extending them through a seat anchor. Also, this space enables the body portion 42 to be angled an offset angle 73, wherein the length axis 15 of the body portion is offset from a vertical axis 14.

The vehicle seat 20 has a top 22, a back rest 24 that extends down from the top 22, six head rest posts 27, 27', 27", 27"', 27"", and 27""' that extend up from the top 22, and three head rests 26, 26', and 26" connected to the head rest posts. Each of the three head rests is connected to two of the head rest posts. Four seat anchors 29, 29', 29", and 29"' are also shown being configured between the back rest 24 portion of the seat and seat portion 28 of the seat. The seat anchors 29, 29', 29", and 29"' are exposed portions of the frame of the vehicle seat 20 that are each a portion of material that forms a fully closed or partially closed loop. The seat anchors 29, 29', 29", and 29"' are typically configured down between back rest 24 and seat portion 28 and therefore are shown in dashed lines, as they are hidden during use.

The body portion 42 of the monolithic support 40 is positioned against the back rest 24 of the vehicle seat 20, and the stabilizer portion 46 of the monolithic support 40 is pulled tight down on top of the top 22 of the vehicle seat 20. The first strap extension 51 and second strap extension 52 of the head rest strap system 50 are each wrapped around a head rest post 27' and 27", to form a first post loop 53 and second post loop 53', respectively. The length of the first post loop 53 and second post loop 53' may be adjusted to move the stabilizer portion 46 laterally between the head rest posts. The first strap extension 51 and second strap extension 52 are coupled to respective head rest fastener couplers (not shown).

The first base strap 60 is configured through one of the seat anchors 29' and is coupled to the base fastener coupler 66 on the base coupler strap 65 to form an anchor loop 63, to secure the bottom end 44 of the body portion 42 and the monolithic support 40 in place. The second base strap 60' is not in use, and therefore the base fastener 62' of the second base strap 60' hangs freely from the second base strap 60'.

The support 40 and the body portion 42 are configured at an offset angle 73, wherein the length axis of the body portion 15 extends said offset angle to the vertical axis 14. The bottom end 44 of the support 40 is pulled toward the seat anchor 29' by the first base strap 60 and the top 30 of the support, or the stabilizer portion 46 is pulled toward the head rest post 27" by the first second strap extension 52. This offset angle 73 may provide a more comfortable angel for supporting a person's upper body.

Figure 3:
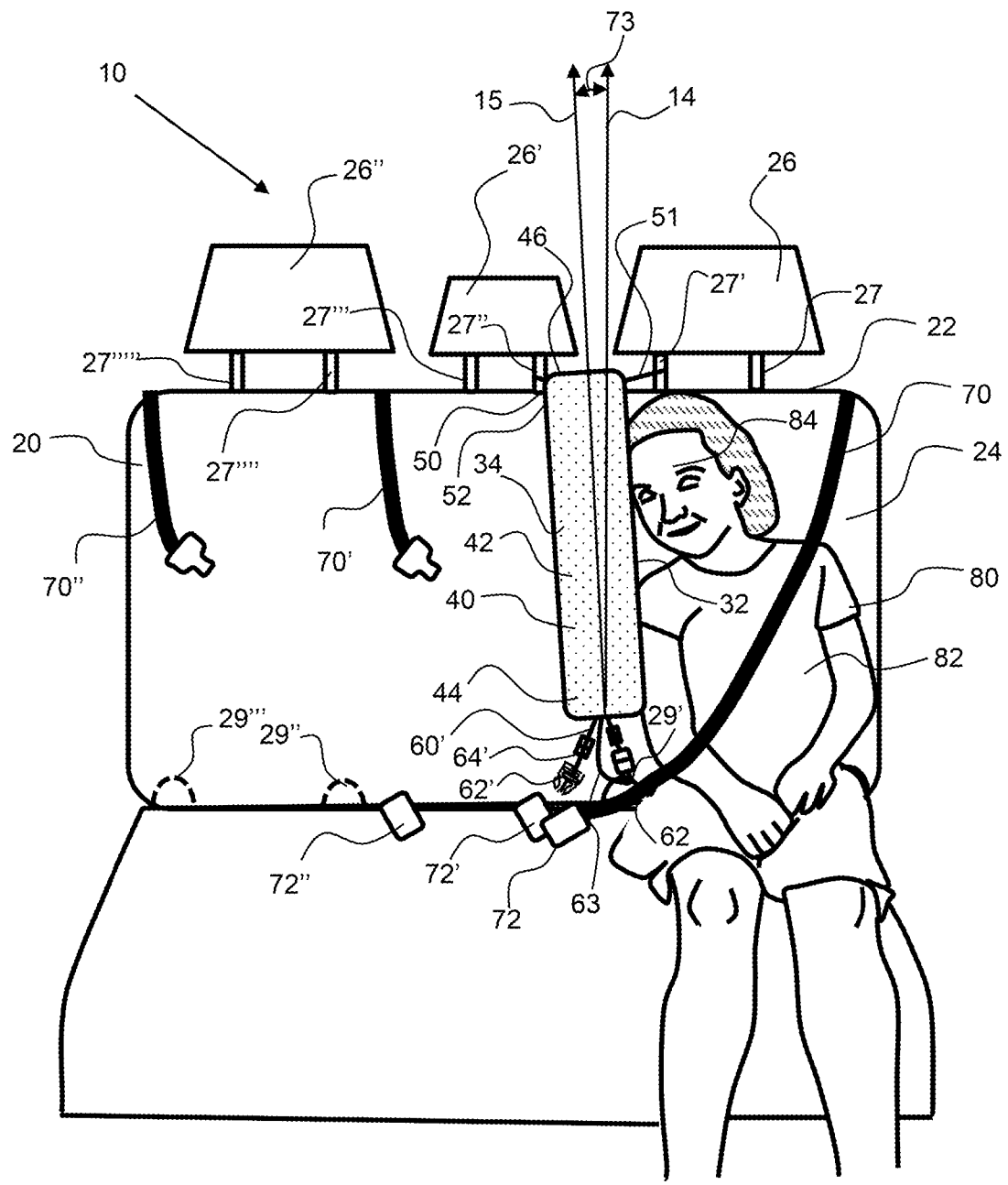
FIG. 3 shows a front view of an exemplary upper body support system as shown in FIG. 2, with a passenger being supported by the monolithic support.

As shown in FIG. 3, a passenger 80, a child, is sitting on the seat portion 28 of the vehicle seat 20 and the passenger's upper body or torso 82 and head 84 are resting on the first side 32 of the body portion 42. The height of the first side 32 and planar extension of the first side 32 provide effective support of the passenger's head 84 and torso 82.

The vehicle seat 20 further comprises three seatbelts 70, 70', and 70", as well as three seatbelt receivers 72, 72', and 72". The first seatbelt 70 is coupled to the first seatbelt receiver 72 and is configured around the passenger 80. Note that by using the seat anchor 29' to secure the bottom end 44 of the body portion 42 in place, all the seatbelt receivers 72, 72', and 72" are still available for use. As shown in FIG. 3, the passenger 80 rests their head 84 and a portion of their torso 82 on the body portion 42 of the monolithic support 40 in order to provide comfort and support when sitting and/or sleeping in the vehicle seat 20. The monolithic support 40 is held in place by the head rest strap assembly 50 wrapped around the head rest posts 27' and 27", as well as the anchor loop 63 configured through the seat anchor 29'. The second base strap 60' is not used and therefore the base fastener 62' of the second base strap 60' hangs freely from the second baste strap 60'. Neither base fastener 62 and 62' is coupled to any of the seatbelt receivers 72, 72', and 72", as the base fasteners 62 and 62' are not shaped or size appropriately to couple with the seatbelt receivers 72, 72', and 72".

Figure 4:
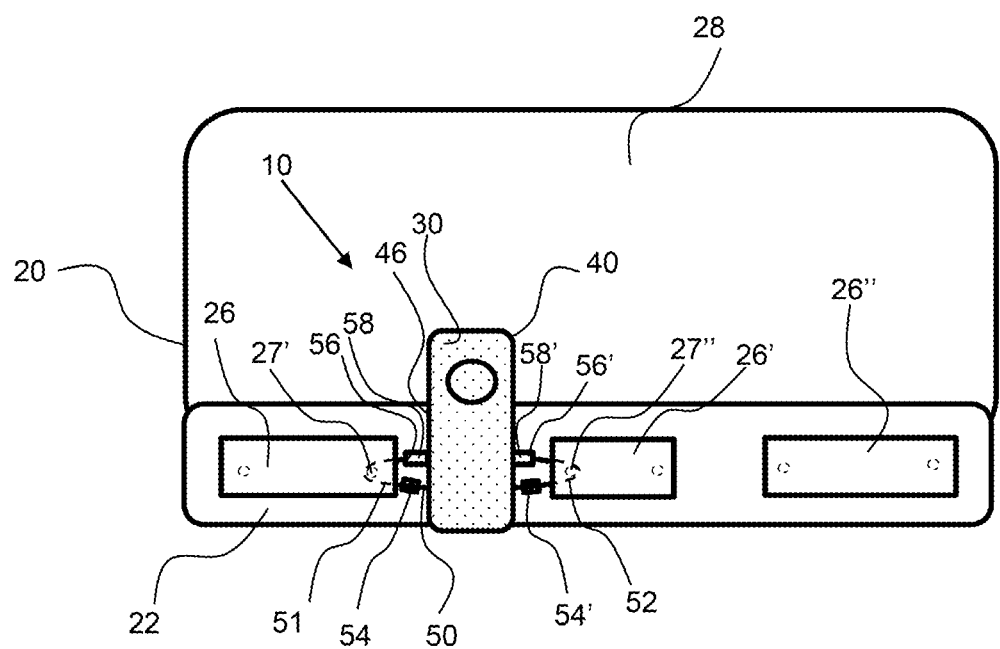
FIG. 4 shows a top view of an exemplary upper body support system.
Figure 5:
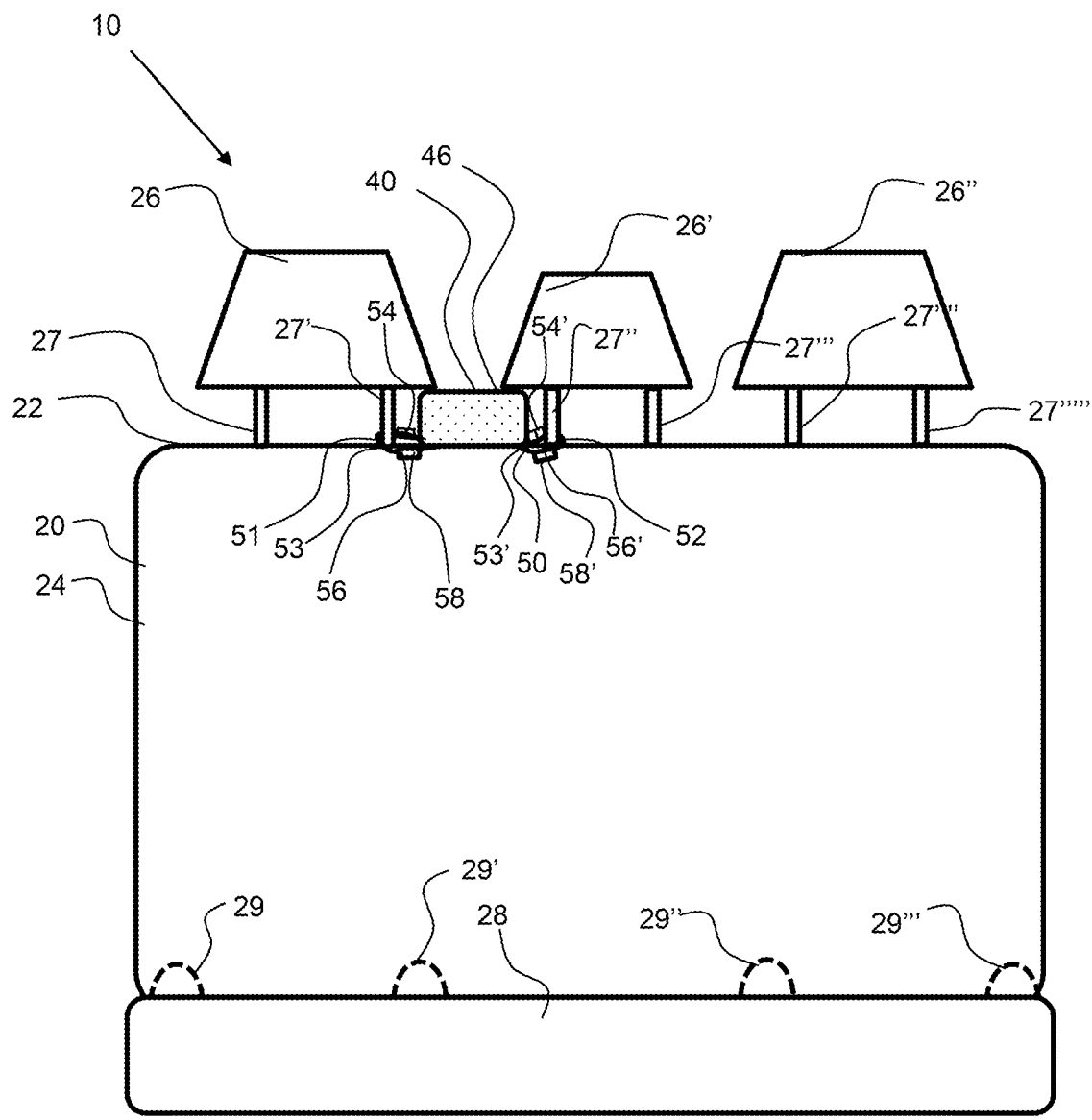
FIG. 5 shows a back view of an exemplary upper body support system.

Referring now to FIGS. 4 and 5, the upper body support system 10 is coupled to head rest posts 27', 27" by the head rest strap assembly 50, wherein the first strap extension 51 and second strap extension 52 extend to form post loops around the head rest posts 27', 27". Each of the first strap extension 51 and second strap extension 52 has a head rest fastener 56, 56', respectively, that is detachably attached to a head rest fastener coupler 58, 58'. As shown in FIG. 4, the stabilizer portion 46 of the monolithic support 40 rests on top of the top 22 of the vehicle seat 20. The first strap extension 51 is wrapped around the head rest post 27' of the first head rest 26, and the second strap extension 52 is wrapped around the head rest post 27" of the second head rest 26'. The head rest fastener 56 is inserted into the head rest fastener coupler 58 to form a loop around the head rest post 27'. Likewise, the second strap extension 52 is wrapped around the head rest post 27" of the head rest 26'. The head rest fastener 56' is inserted into the head rest fastener coupler 58' to form a post loop around the head rest post 27".

FIG. 5 is a back view of the upper body support system 10 that shows the coupling of the first strap extension 51 and second strap extension 52 of the head rest strap 50.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An upper body support system for a vehicle seat comprising:
   a) said vehicle seat comprising:
      i) a top,
      ii) a back rest,
      iii) a first head rest having a first head rest post;
      iv) a second head rest having a second head rest post; and
      v) a seat anchor;
   b) a monolithic support comprising:
      i) body portion; and
      ii) a stabilizer portion that extends orthogonally from said body portion;
   wherein the monolithic support is configured on said vehicle seat with the stabilizer portion extending over said top of said vehicle seat and with the stabilizer portion extending down along the back rest of said vehicle seat;
   wherein the body portion extends from the stabilizer portion down to a bottom end;
   c) a head rest strap assembly that is coupled to the monolithic support and forms a first post loop that extends around said first head rest post and a second post loop that extends around said second head rest post, said head rest strap assembly comprising:
      i) a first strap extension;
      ii) a first head rest fastener configured on the first strap extension;
      iii) a first head rest fastener coupler;
      iv) a second strap extension;
      i) a second head rest fastener configured on the second strap extension;
      ii) a second head rest fastener coupler;
   wherein the first strap extension is detachably attached to the first head rest fastener coupler to form said first post loop around said first head rest post; and
   wherein the second strap extension is detachably attached to the second head rest fastener coupler to form said second post loop around said second head rest post;
   d) a base strap assembly comprising:
      i) a first base strap;
      ii) a first base fastener configured on the first base strap;
      iii) a base fastener coupler coupled to the body portion;

wherein an anchor loop is formed by the first base strap detachably attached to the base fastener coupler, and wherein said anchor loop extends through said seat anchor to secure the monolithic support to said anchor.

2. The upper body support system of claim 1, wherein the head rest strap assembly further comprises a coupler extension strap that extends from the head rest strap assembly to the base strap assembly.

3. The upper body support system of claim 2, wherein the coupler extension strap extends from the base strap, wherein the base strap and the coupler extension strap are a continuous strap.

4. The upper body support system of claim 1, wherein the base strap assembly further comprises a first base strap slider coupled with the first base strap and configured to adjust a length of the anchor loop.

5. The upper body support system of claim 1, wherein the base strap assembly further comprises a base coupler strap and wherein the base fastener coupler is configured on said base coupler strap.

6. The upper body support system of claim 1, wherein the base strap assembly further comprises a second base strap comprising a second base fastener configured on the second base strap and configured to detachably attach to the base fastener coupler.

7. The upper body support system of claim 6, wherein the base strap assembly further comprises a base coupler strap and wherein the base fastener coupler is configured on said base coupler strap.

8. The upper body support system of claim 7, wherein the base strap assembly further comprises a base strap slider coupled with the anchor loop and configured to adjust a length of the anchor loop.

9. The upper body support system of claim 1, wherein the head rest strap assembly further comprises:

a first head rest strap slider coupled with the first post loop and configured to adjust a length of the first post loop;
a second head rest strap slider coupled with the second post loop and configured to adjust a length of the second post loop.

10. The upper body support system of claim 9, wherein the first post loop is at least 20% longer than said second post loop.

11. The upper body support system of claim 1, wherein the body portion has a length of 300 mm or more.

12. The upper body support system of claim 1, wherein the stabilizer portion has a length of 150 mm or more.

13. The upper body support system of claim 1, wherein the body portion has a width across the seat surface of 75 mm or more.

14. The upper body support system of claim 13, wherein the stabilizer portion has a width across the top-seat surface of 75 mm or more.

15. The upper body support system of claim 1, wherein the body portion has height of 75 mm or more.

16. The upper body support system of claim 1, wherein the body portion has a first side and a second side and wherein a height of said first side and a height of said second side are each 75 mm or more.

17. The upper body support system of claim 16, wherein the first side and second side are planar surfaces.

18. The upper body support system of claim 1, wherein the monolithic support is made from a single piece of foam that forms the stabilizer portion and the body portion.

19. The upper body support system of claim 1, further comprising a cover configured over monolithic support.

20. The upper body support system of claim 1, wherein the base fasteners are configured not to insert into a seatbelt receiver.

* * * * *